(12) United States Patent
Smith

(10) Patent No.: US 6,264,219 B1
(45) Date of Patent: Jul. 24, 2001

(54) UTILITY CART

(76) Inventor: Dave W. Smith, 238 Scarboro Avenue S.W., Calgary, Alberta, T3C 2H3 (CA)

(*) Notice: Subject to any disclaimer, the term of this patent is extended or adjusted under 35 U.S.C. 154(b) by 0 days.

(21) Appl. No.: 09/370,109

(22) Filed: Aug. 6, 1999

(51) Int. Cl.[7] .................................................. B62B 5/00
(52) U.S. Cl. ................... 280/79.11; 280/79.2; 280/79.3; 280/47.34; 280/47.35; 135/125
(58) Field of Search .............................. 280/79.11, 79.2, 280/79.3, 47.34, 47.35; 135/125

(56) References Cited

U.S. PATENT DOCUMENTS

| | | |
|---|---|---|
| 1,086,515 | 2/1914 | Craft . |
| 2,477,827 | 8/1949 | Robinson ............................... 287/86 |
| 2,546,026 | 3/1951 | Coon ...................................... 250/33 |
| 2,634,935 | 4/1953 | Carpenter ............................ 248/181 |
| 3,651,894 | 3/1972 | Auriemma ............................. 188/19 |
| 3,727,245 * | 4/1973 | Gerth .......................................... 5/14 |
| 3,782,746 * | 1/1974 | Isaacs ............................... 280/33.996 |
| 3,868,123 * | 2/1975 | Berg et al. .......................... 280/79.2 |
| 3,893,686 * | 7/1975 | Morgan ................................. 280/651 |
| 3,908,562 * | 9/1975 | Wittschen .......................... 280/79.11 |
| 3,963,258 | 6/1976 | Stone ................................. 280/47.34 |
| 3,986,582 | 10/1976 | Dye ......................................... 188/31 |
| 3,999,775 * | 12/1976 | Brongo ................................ 280/79.2 |
| 4,084,663 | 4/1978 | Haley ...................................... 188/31 |
| 4,249,749 * | 2/1981 | Collier ................................... 280/35 |
| 4,450,969 * | 5/1984 | Marsh, Jr. ............................ 211/189 |
| 4,512,591 * | 4/1985 | Plante ................................. 280/47.35 |
| 4,657,299 | 4/1987 | Mahan ................................. 296/159 |
| 4,679,662 | 7/1987 | Nordskog ............................ 188/1.12 |
| 4,863,179 * | 9/1989 | Isaacs ............................... 280/33.996 |
| 4,986,596 | 1/1991 | Gohier ................................. 296/203 |
| 4,998,742 * | 3/1991 | Maynard ................................ 280/35 |
| 5,040,641 | 8/1991 | Phillips et al. ...................... 188/1.12 |
| 5,199,729 * | 4/1993 | Sievert et al. ..................... 280/47.35 |
| 5,199,814 | 4/1993 | Clark et al. ............................ 404/10 |
| 5,438,938 * | 8/1995 | Meeker et al. ......................... 108/91 |
| 5,730,452 * | 3/1998 | Fields ................................. 280/47.35 |
| 5,749,589 | 5/1998 | Hopkins et al. .................. 280/47.34 |
| 5,873,585 * | 2/1999 | Engelking ......................... 280/47.35 |
| 5,893,439 | 4/1999 | Park .......................................... 192/4 |
| 5,927,745 * | 7/1999 | Cunningham ....................... 280/652 |
| 6,079,719 * | 6/2000 | Tisbo et al. ....................... 280/47.35 |

* cited by examiner

Primary Examiner—Brian L. Johnson
Assistant Examiner—Deanna Draper
(74) Attorney, Agent, or Firm—Sheridan Ross P.C.

(57) ABSTRACT

A utility cart is provided which minimizes damage caused by impact with objects, particularly for use on a windy airport tarmac, the cart comprising a frame having main wheels bearing most of the cart's weight, these main wheels being fitted with latch-type brakes. The cart has a top structure, such as a roof, which extends horizontally above the frame, the periphery of which approximates or extends beyond the periphery of the frame. The top structure is normally supported above the cart's frame using three or more laterally collapsible supports for permitting the top structure to be displaced laterally while remaining substantially horizontal so as to minimize energy transfer upon lateral impact of the periphery of the top structure with an object. Each of the preferred collapsible supports comprises a tubular member elastically sandwiched between top and bottom plates mounted to the top structure and frame respectively.

43 Claims, 6 Drawing Sheets

UTILITY CART

FIELD OF THE INVENTION

The present invention relates to wheeled carts used for carrying a payload such as baggage, particularly those used in the airport environment which is subject to wind and around equipment which is sensitive to impact damage.

BACKGROUND OF THE INVENTION

An airport tarmac is just one environment in which windy conditions can adversely affect the serviceability of utility carts. The airport tarmac is a utilitarian surface, used primarily by support personnel in the business of servicing aircraft and transporting baggage. Baggage is some times transported on carts towed behind small motorized vehicles. Other carts are hand-powered. In the case of commuter aircraft, passengers also access the tarmac for boarding the aircraft from the ground. In such cases, it is usual for the airline operator to park a small hand-powered cart between the terminal building and the aircraft.

Passengers place their baggage on this cart as they leave the terminal. Airline personnel may also place the baggage on such a cart for passengers to pick up as they deplane and approach the terminal.

The cart is manually pushed about the tarmac. When placed in the vicinity of aircraft, the cart is subject to aircraft jet blast, propeller wake, and general wind conditions unimpeded by barriers. Baggage carts present a large wind catching surface, particularly when loaded. The above incidents of wind can cause the carts to roll on their wheels, to overpower friction brakes, or to pivot or skid about a non-rotating wheel or wheels. A moving cart is a hazard for personnel, but more frequently becomes a hazard to aircraft. Incidents of an impact of a cart with an aircraft are known and damaging. Contact of a cart is typically between the top or roof of a cart and the highly engineered and easily damaged skin of an aircraft fuselage or with the propeller which can result expensive repair and service costs.

In U.S. Pat. No. 5,862,884 issued to Applicant, the problem of wind has been partially addressed in the implementation of an airfoil on a portable wheelchair lift for use on airport tarmacs. While the use of airfoils on a lift or a cart convert lateral wind loading to a downward force for resisting overturning, it does not address the eventual impact issues with a cart, whether during handling or due to wind.

A variety of prior art carts are in use, none of which have proven particularly satisfactory to the airlines in part because:

they are hard to push;
the carts are insufficiently resistant to being wind driven into the aircraft; or
regardless of the reason for an impact, the contact of a cart and an aircraft results in damage.

It is known to equip prior art carts with brakes, as described in U.S. Pat. No. 3,651,894 to Auriemma. Auriemma discloses a serving cart with friction brakes, operated with a dead-man arrangement of a handle and drum-brakes with an actuating cable therebetween. A spring normally applies braking pressure until the handle is pushed or pulled. In U.S. Pat. Nos. 3,986,582 to Dye and 4,084,663 to Haley, latching type dead-man braking arrangements disclosed for a serving cart and carriage respectively. Both Dye and Haley disclose braking systems which use spring-biased pins which engage complementary opening in the sides of supporting wheels. Dye locates supporting wheels mid-cart and both are fitted with the brakes to avoid rotation.

When the operator releases the brake however, operator inattention can result in a collision with other objects. In the context of an airport tarmac, accidental contact of lower portions of the cart are rarely significant, being with tires or other sturdy structures. However, contact of the top of the cart can happen and is usually with the sensitive aircraft fuselage or a propeller.

No known prior art utility carts employ energy absorbing means about the cart's upper periphery.

Accidental impact has been addressed by others is situation where the damage-sensitive object is moving. In U.S. Pat. No. 2,546,026 to Coon for instance, an early use of a closed coil spring is disclosed as a mounting between an antenna and an automobile. Lateral impact of the antenna causes the spring to deflect, absorbing the energy and avoiding damage to the antenna. In U.S. Pat. No. 5,199,814 to Clark et al., a signpost is fitted with coupling to a base, the coupling permitting the signpost to pivot over from an upright to a prone position when struck by a vehicle. Deflection of the signpost limits damage to the post and to the vehicle. The coupling arrangement utilizes a tension cable between the base and the signpost. Deflection of the signpost and cable compresses a spring within the signpost, allowing the signpost to move and creating a righting force. The top of the post can rotate to the ground if run completely over by the offending vehicle.

In the context of a utility cart used at an airport, the upper structure often serves also as a load-carrying platform. In the case of the prior art coil spring mounting of Coon, the spring is unsuitable for supporting vertical loads, tending to buckle or collapse upon itself. The signpost coupling of Clark et al. has a narrow point of contact which aids in its rotation but does not assist, nor anticipate incorporation of a load-supporting structure while continuing to permit energy-absorbing deflection when struck from the side.

Regarding the braking issue, prior art use of friction brakes is limited to instances where the lateral forces can exceed the frictional pre-load. The extraordinary wind loading imposed on a cart on an airport tarmac can easily overcome friction brakes, particularly if the effectiveness of the brakes depends on wear or maintenance.

Those prior art carts which are fitted with latching type brakes have not dealt with the impact issue which can also occur when an operator has consciously released the brakes.

Therefore, there is a demonstrated need for a utility cart which has a system of supporting wheels and brakes which ensures immobility when stopped and which has an energy absorbing periphery for minimizing or eliminating impact damage regardless of the state of the cart.

SUMMARY OF THE INVENTION

A novel utility cart is provided which permits safe operation around sensitive equipment, particularly due to the cart's ability to absorb the energy of accidental impact therewith. In the case of operation in windy environments, the cart is further resistant to induced movement which can contribute to such accidental impact. Induced movement includes that due to wheel skidding, cart rotation or brake failure. Factors contributing to the cart's newfound sure-footedness includes: concentrating the carts weight on two or more main wheels for minimizing wind-induced rotational moments and for lessening wheel skidding, implementing positive latching type brakes on those main wheels to avoid brake failure, and applying an airfoil roof for lessening the overturning moment and increasing the wheel loading for reinforcing the anti-skid advantages.

Therefore, in a broad apparatus aspect, a utility cart is provided which minimizes damage caused by impact with objects, the cart comprising a wheeled frame having a top structure extending horizontally above the frame, the top structure having a periphery which approximates the periphery of the frame; and supports for normally supporting the top structure above the frame, the supports being laterally collapsible for permitting the top structure to be displaced laterally while remaining substantially horizontal so as to minimize energy transfer upon lateral impact with the periphery of the top structure.

Preferably, three or more upright-biased supports are used to support the top structure, such as a roof, so that payloads can supported thereon yet, under lateral impact, they will still deflect laterally, absorbing the energy of the impact. The preferred support is a tubular member sandwiched between top and bottom plates and having a tensioning means secured between the top and bottom plates for elastically connecting the top and bottom plates. One such a tensioning member is a cable having a spring compressed between the bottom plate and the bottom end of the cable.

When a roof is employed as the top structure, it is preferably shaped as an airfoil for interacting with airflow flowing thereover so as to generate downward forces with the associated advantages therewith.

BRIEF DESCRIPTION OF THE DRAWINGS

FIG. 3a is a side view of a cart according to FIG. 1a;

FIG. 3b is an end view of a cart according to FIG. 1a;

DETAILED DESCRIPTION OF THE PREFERRED EMBODIMENTS

Figure 1A:
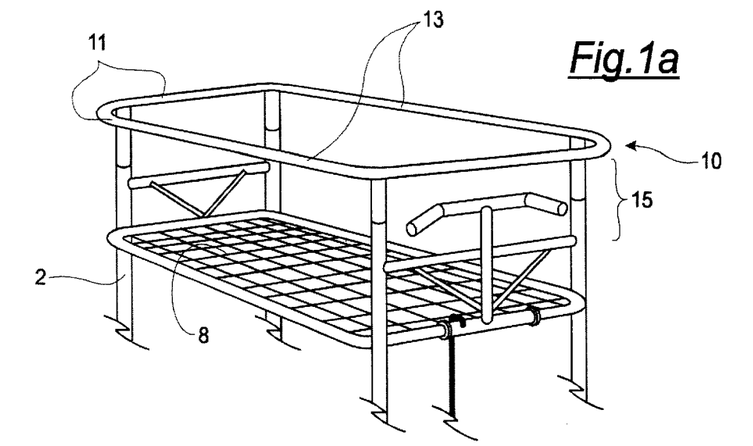
FIG. 1a is a perspective view of a utility cart, typically used as an airport tarmac baggage cart, which implements several embodiments of the present invention, the top periphery being formed as a roof.

Having reference to FIG. 1, a utility cart 1 comprises a rigid frame 2 supported on main pneumatic wheels 3 and secondary casters 4. The cart is about an airport tarmac 5 on wheels 3 and 4. The cart's frame 2 is substantially a rectangular parallelepiped stick-frame construction of a mixture of round and square tubing. Significant use of aluminum tubing material aids in minimizing the cart's weight.

Figure 3A:
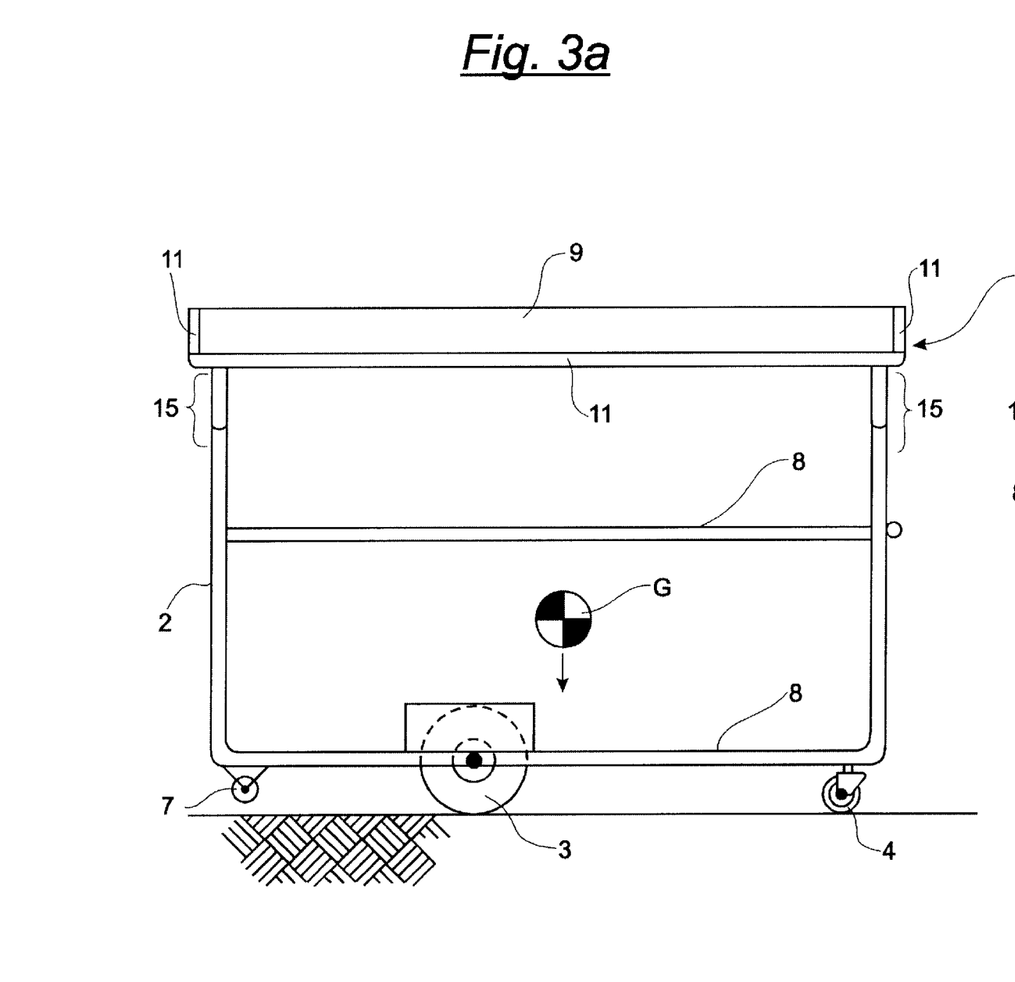
Figure 3B:
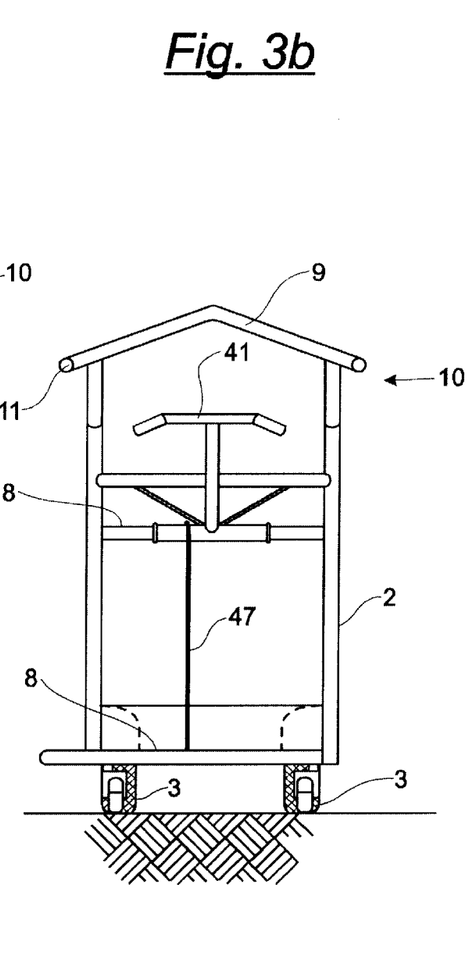

Referring to FIGS. 1a and 3a, the cart's frame 2 is supported upon the two main wheels 3 which are fitted with a braking system 6. The main wheels are located near the cart's center of gravity G, supporting about 85% of the cart's weight and ensuring low-rolling resistance. The secondary casters 4 pick up the remaining 15% and enable ease of turning. Tertiary safety casters 7 are normally not in contact with the tarmac 5 may do so if the cart is rocked or if improperly loaded.

Two parallel baggage-supporting shelves 8 are arranged in the cart's frame 2, covered by a roof 9. The roof 9 is a substantially horizontal top structure 10 which has peripheral edges 11 which extend beyond the plan or periphery of the frame 2. Preferably, the profile of the roof 9 is formed as an airfoil—i.e. having a convex upper curved surface or peak.

Accordingly, when wind or jet blast impinges on the cart 2, the central positioning of the main support wheels 3 tends to balance the resulting rotational torque produced. Further, as the bulk of the cart's weight is on the braking wheels 3, maximal sliding resistance is generated between the wheels 3 and the tarmac 5. Finally, the wind also flows over the airfoil roof 9, producing a downward force and thereby adding to the wheel's normal force and further aiding in resisting overturning and rotation.

The roof 9 may also be used as an additional baggage-supporting shelf (see FIG. 2) and thus is also capable of supporting typical baggage loads. The roof 9 can be fitted with a small rail to prevent baggage from sliding off (not shown).

Figure 2:
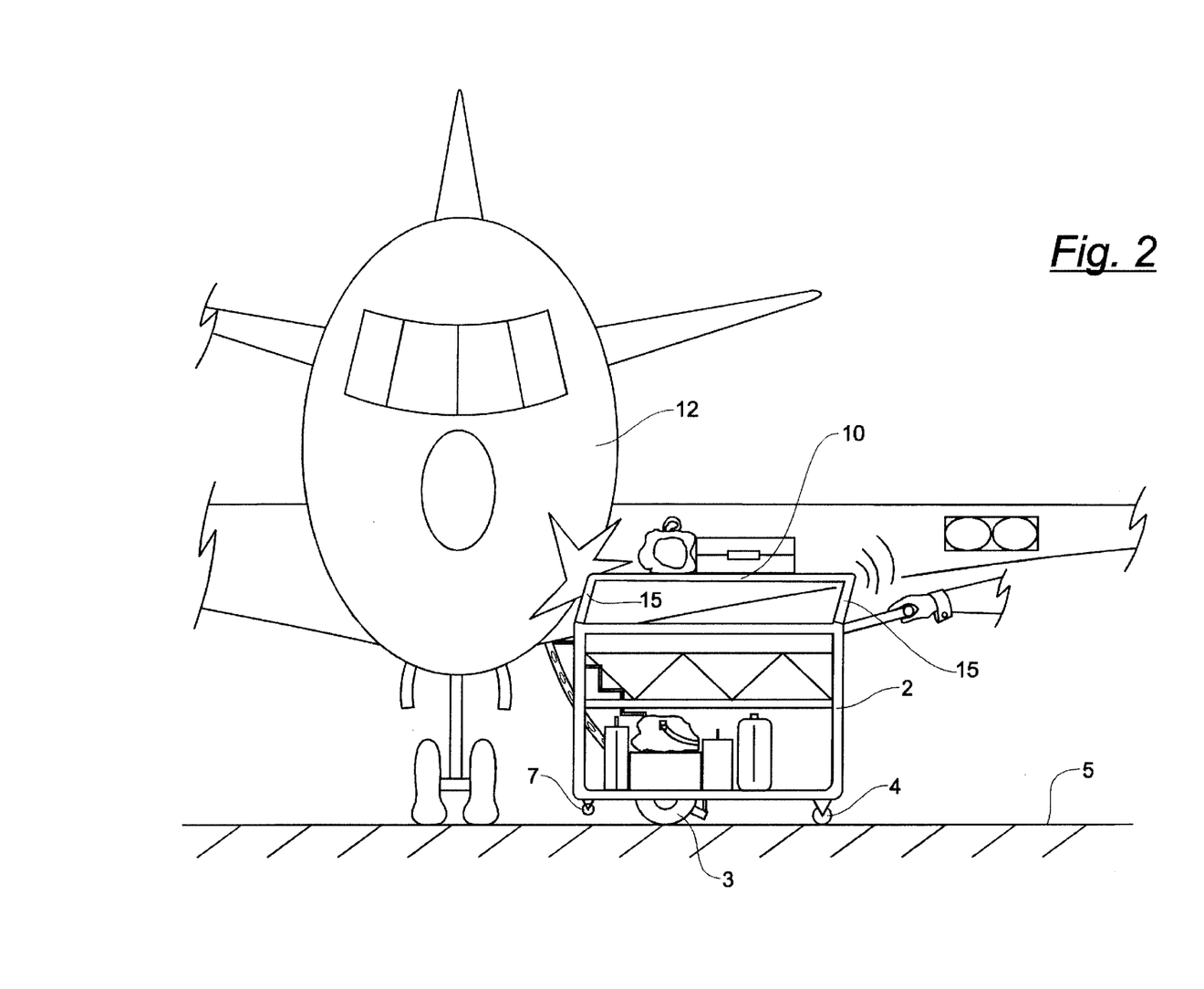
FIG. 2 is a fanciful side view of a cart according to an embodiment of the invention which has impacted an aircraft fuselage wherein the roof structure has deflected, avoiding damage to the aircraft.

As shown in FIG. 2, the top of the cart 2 is typically the point of first contact with objects such as an aircraft 12. Accordingly, the top structure 10 is designed to deflect laterally and absorb the energy of any contact or impact having a lateral component.

Figure 1B:
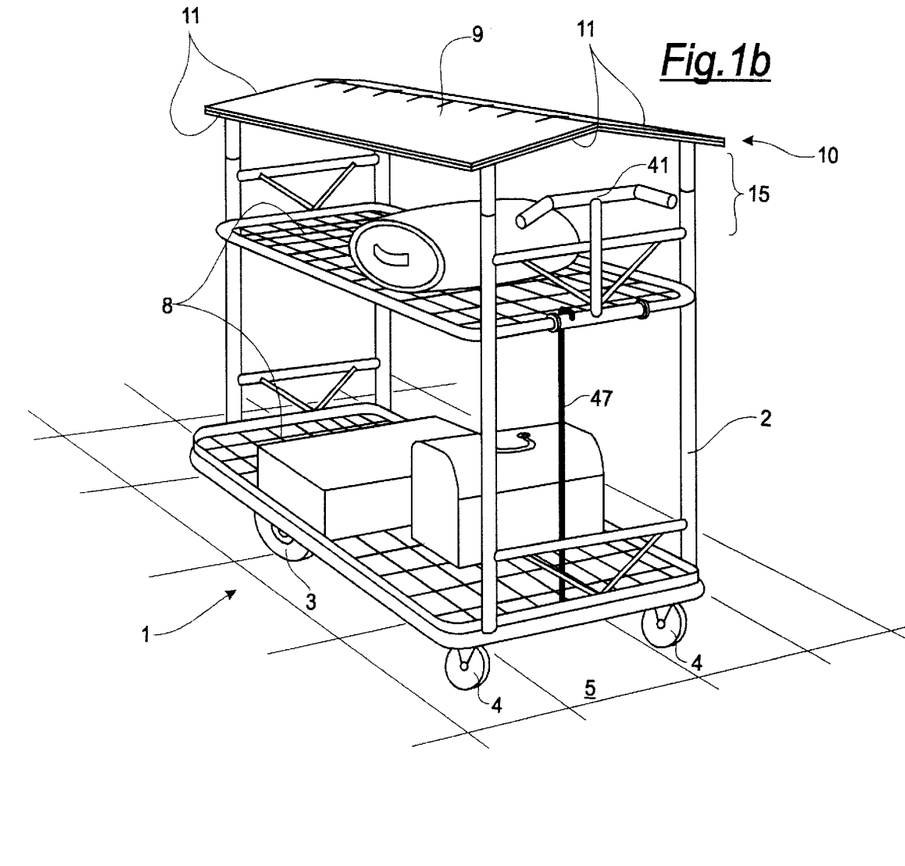
FIG. 1b is partial perspective view of an alternate top structure for the cart of FIG. 1a, the illustrated periphery having no roof but still having an energy-absorbing function.

Referring to FIG. 1b, the roof of FIG. 1a is alternatively replaced with a mere bumper frame 13. As is the case with a roof-type structure 9, the periphery 11 of the top structure 10 of the bumper frame 13 extends laterally from the plan of the frame 2, so as to increase the probability that the bumper 13 will be the first to contact the aircraft 12 and thus absorb impact-energy. Additional resilient nosing material (not detailed) can be added to the periphery 11 to provide additional contact protection.

In any case, the top structure 10 is itself rigid, but is supported on movable supports 15.

Figure 4A:
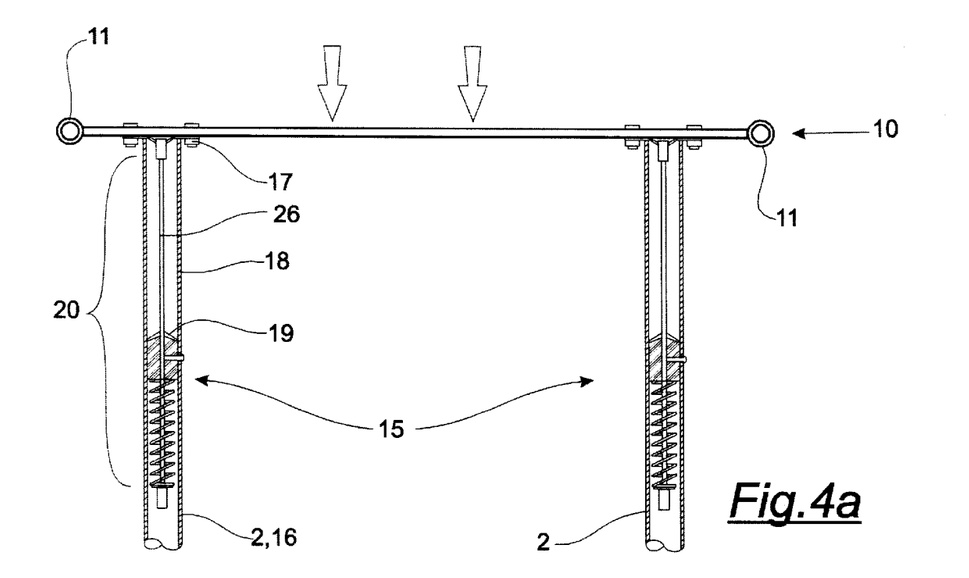
FIG. 4a is a side, cross-sectional view of a simplified flat top structure mounted to supports depicted in the normally upright position.
Figure 4B:
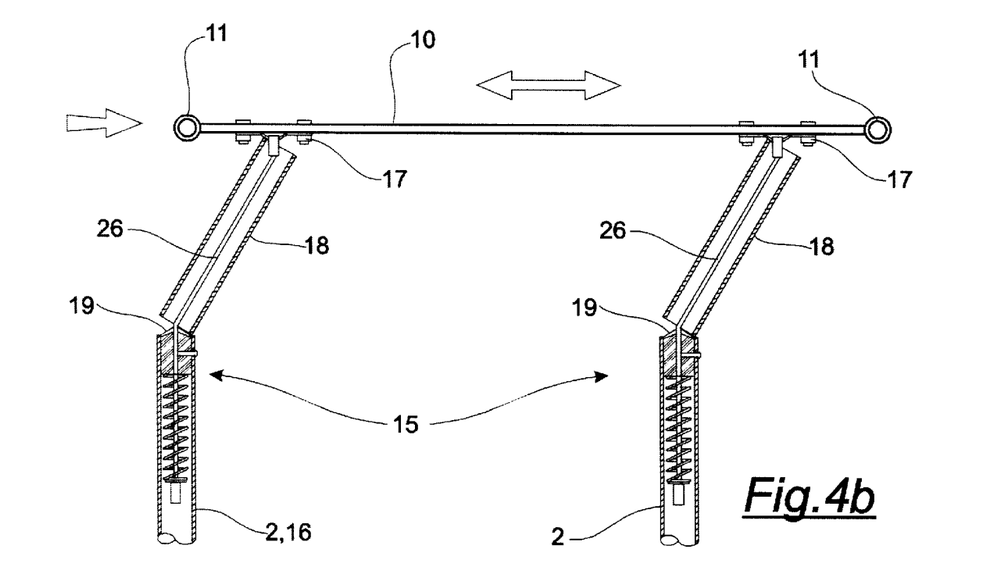
FIG. 4b is a side, cross-sectional view according to FIG. 4a illustrating deflected top structure and supports after a lateral impact.
Figures 5A, 5B:
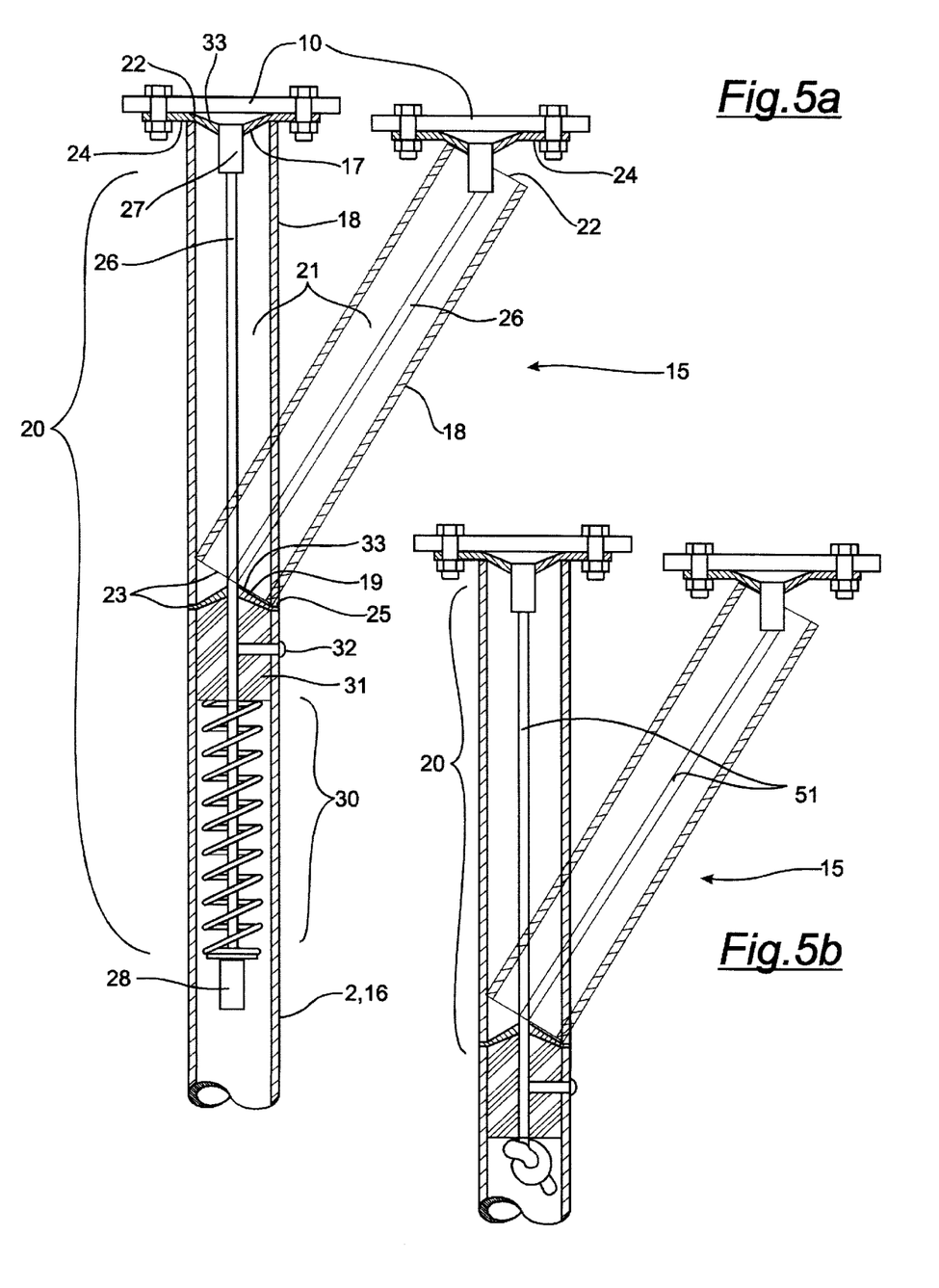
FIG. 5a is a side, cross-sectional view according to FIGS. 4a and 4b illustrating the support in its normally upright (solid lines) and in the deflected position (phantom lines) positions.
FIG. 5b is a side, cross-sectional view of an alternate form of the support using an elastic tensioning means.

Having reference to FIGS. 4a, 4b and 5a, each support 15 comprises a base 16, formed in the frame 2, a bottom plate 19, a tubular member 18, a top plate 17 and a tensioning means 20. The top plate 17 is mounted to the top structure 10. Three or more supports 15 are provided so that the top structure 10 remains substantially horizontal when deflected laterally (FIGS. 2,4b) thereby preventing spillage of any supported baggage.

The tensioning means 20 extends between the top plate 17 and the bottom plate 19, elastically sandwiching the tubular member 18 therebetween. The tubular member 18 is a tubular body having a bore 21 and parallel right planer top and bottom ends 22,23. The top plate 17 has a planer surface 24 and the bottom plate 19 has a planer surface 25 which is parallel to and faces the top plate's planer surface 24. The tubular member's planer top and bottom ends 22,23 are complementary to the top and bottom plate planer surfaces 24,25. Without further structure, a vertical load on the top plate 17 is supported by the tubular member 18 and bottom plate 19. Practically however, such an arrangement is unstable and slight lateral movement causes the tubular member 18 and the supported top structure to collapse sideways.

Accordingly, the tensioning means 20 comprises an elongated connector or cable 26 extending between the top and bottom plates 17,19 and through bore 21, increasing the support's overall stability. Typically, the cable 26 is formed of wire rope which is substantially inextensible, but is weak laterally so that it may be readily deflected to the side.

The cable 26 has top and bottom ends 27,28, the top end 27 being secured to the top plate 17. The cable 26 extends through the bore 21 and through the bottom plate 19. The bottom end 28 of cable 26 is affixed to the bottom of a compression spring 30. The compression spring 30 is pre-loaded by sandwiching it between a spring stop 31, which bears against the bottom plate, and the bottom end 28 of the inextensible cable 26. For assembly purposes, the spring stop 31 is installed within the bore of a tubular portion of the frame 2 and affixed therein using a retaining pin 32.

As shown in FIG. 4b and the shadow lines in FIG. 5a, upon lateral deflection of the top structure 10, such as from impact, the tubular member 18 pivots and the tensioning means 20 absorbs the energy of the deflection.

It can be seen that use of a tensioning means 20 which extends through the bore 21 of the tubular member 18 also guides the member and prevents its dislodging from the top and bottom plates 17,19. However, a more preferred arrangement is to provide a centrally-located protuberance 33 in the center of each of the top and bottom plates 17,19. Accordingly, the bore 21 of the tubular member 18 is constrained substantially concentric with the top and bottom plates 17,19, ensuring its return to its original upright position when the deflecting force is removed.

Figure 6:
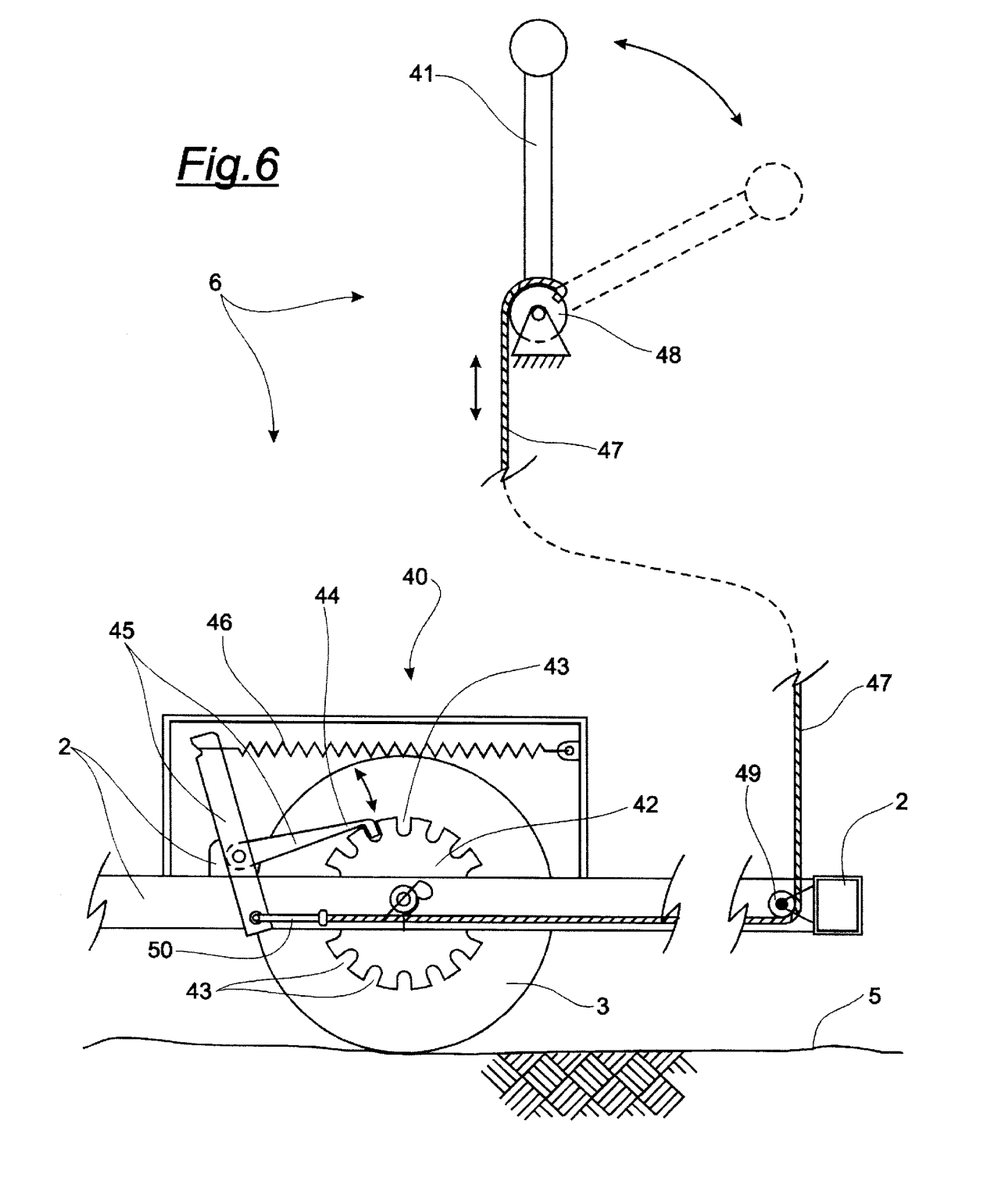
FIG. 6 is a partial side view of the main supporting wheels, a dead-man braking system and a hand-actuating handle as applied to the present invention.

As stated above, incidents of accidental impact can be minimized if the cart 2 is not able to move except when consciously operated. To that end, a dead-man braking system 6 is provided. If an operator is not actively moving the cart 2 then the braking system 6 engages, positively locking the wheels 3 which then must skid if the cart 2 is to move at all.

As shown in FIG. 6, the braking system 6 utilizes latch-type brakes 40 fitted to each of the two main wheels 3, and a hand-release push-handle or actuator 41. Each brake 40 comprises a disc 42 co-rotating with each wheel 3. A plurality of circumferentially-spaced index slots 43 are cut radially into the disc 42. A spring-loaded latch 44 radially engages the slots 43 to positively prevent disc and wheel rotation. The latch 44 extends from a lever 45, pivoted from the frame 2. A spring 46 is affixed to the lever for biasing the latch into engagement with the disc slots 43. The push-handle actuator 41 is connected to the lever using a release cable 47. The release cable 47 is wrapped around a cam 48 on the actuator 41. When the push-handle actuator 41 is rotated for pushing operation of the cart 2, the rotation is converted into a release cable-pulling action. The release cable 47 extends about a pulley 49 and runs beneath the cart 2 to the brake's levers 45. For operating the brakes 40 simultaneously, a bar and V-yoke 50 (not detailed) connects both levers 45 for both brakes 40 and the release cable 47 connects to the apex of the yoke 50.

The apparatus of the invention may be employed whether the cart 2 is standing or is moving. When moving, the operator rotates the push-handle actuator 41 for releasing the brakes 40 and pushes or pulls the cart 2 which can subsequently impact an object 12. When standing, the brakes 40 are positively engaged, minimizing the opportunity for the cart to move, but if it does skid, or another object 12 moves into contact with it, the structure 10 on the novel cart deflects.

When an impact of the top structure 10 results in a lateral force component, the top structure deflects laterally, rotating the supports 15 for absorbing the impact energy. Lateral deflection causes the tubular member 18 to rotate, laterally bending the cable 26 causing each top plate 17 to pull their respective cables 26, drawing each cable 26 upwardly through their bottom plate 19. The bottom end 28 of each inextensible cable 26 compresses its spring 30, increasing the spring's compression and the tension in the cable 26 for producing increased resistance to deflection as the support 15 rotates. Depending upon whether baggage is also being carried on the top structure 10 it may or may not self-right itself under the increased tension in the cable 26.

An example of a utility cart which is based upon the above elements is a 1.34 m high, 2.34 m long by 0.84 m cart, constructed substantially of 6061 T-6 aluminum and having a tare weight of about 85 kgs. With two shelves, the cart has a capacity of about 350 kgs and can be manipulated by one person. Fitted with latch-type brakes on the two main pneumatic wheels and using an airfoil roof as the top structure, the cart is stable in a 100 kph wind. Wind effect and stability is obviously a function of the nature and arrangement of the baggage on the cart.

As shown in FIG. 5b, other tensioning means such as a low-creep elastic cord 51 could be utilized for tensioning the supports, thereby replacing both the inextensible cable and the compression spring.

While various embodiments to the present invention have been described in detail, it is apparent that modifications and adaptations of those embodiments will occur to those skilled in the art. However, it is to be expressly understood that such modifications and adaptations are within the spirit and scope of the present invention as set forth in the following claims.

The embodiments of the invention for which an exclusive property or privilege is claims are defined as follows:

1. A utility cart which minimizes damage caused by impact with objects comprising:
   (a) a wheeled frame;
   (b) a top structure extending horizontally above the frame, the structure having a periphery which approximates the periphery of the frame; and
   (c) means for normally supporting the top structure above the frame, the supporting means including a support having a base member rigidly connected to the wheeled frame and a tubular member flexibly connected to the top structure and being laterally collapsible for permitting the top structure to be displaced laterally while remaining substantially horizontal so as to minimize energy transfer upon lateral impact with the periphery of the top structure, wherein in an uncollapsed mode the longitudinal axes of the base member and tubular member are at least substantially parallel and in a collapsed mode the longitudinal axes of the base member and tubular member are transverse to one another.

2. The utility cart as recited in claim 1 wherein the support means comprises three or more of the supports, the supports being biased in the upright position so as to support vertical loads, yet under lateral impact will deflect laterally, absorbing the energy of the impact.

3. The utility cart as recited in claim 2 wherein the top structure is a load-bearing roof.

4. The utility cart as recited in claim 3 wherein the roof is shaped as an airfoil for interacting with airflow flowing thereover so as to generate downward forces.

5. The utility cart as recited in claim 2 wherein each support comprises:
   (a) a bottom plate mounted to the frame;
   (b) a top plate mounted to the top structure and in a first position being normally located vertically above the bottom plate;
   (c) the tubular member extending between the top and bottom plates and having a bottom end abutting the bottom plate and a top end abutting the top plate, the top and bottom ends of the tubular member cooperating with their respective top and bottom plates such that vertical loads can be transferred from the top to the bottom plates; and
   (d) tensioning means secured between the top and bottom plates for elastically connecting the top and bottom plates, spaced by the tubular member, so that under vertical loads to the top plate, the tubular member is maintained normally upright, and under lateral loads to the support or top plate, the top plate and top of the tubular member deflect laterally with minimal resistance to the lateral load.

6. The utility cart as recited in claim 5 wherein
   (a) the tubular member is a tubular body having a bore and parallel right planar top and bottom ends; and
   (b) the top plate has a planar surface and the bottom plate has a planar surface which is parallel to and faces the top plate's planar surface.

7. The utility cart as recited in claim 6 wherein each planar surface of the top and bottom plates has central protuberances which project into the bore of their respective abutting tubular member's top and bottom ends, so that when the top end of the tubular member is deflected laterally, the top end of the tubular member pivots about the protuberance on the top plate and the bottom end of the tubular member pivots about the protuberance on the bottom plate.

8. The utility cart as recited in claim 7 wherein the tensioning means is an elastic member.

9. The utility cart as recited in claim 7 wherein the tensioning means comprises:
   (a) an elongated connector having top and bottom ends, the elongated connector being laterally flexible, the top end of which is affixed at the top structure and the bottom end of which extends through the protuberance of the bottom plate; and
   (b) an elastic compression member located beneath the bottom plate and having top and bottom ends, the top end abutting the bottom plate, the bottom end of the elongated connector being affixed at the bottom end of the elastic compression member so that when the top end of the tubular member is deflected laterally, the bottom end of the tubular member pivots about the protuberance on the bottom plate, pulling the bottom end of the elongated connector and compressing the compression member, thereby creating a tubular member righting-force.

10. The utility cart as recited in claim 9 wherein the elongated connector is a cable.

11. The utility cart as recited in claim 10 wherein the compression member is a coil spring.

12. The utility cart as recited in claim 1 further comprising:
   (a) three or more wheels for movably supporting the cart upon the tarmac, at least two of which are fitted with latch-type brakes which are normally latched; and
   (b) means for unlatching the brakes only when operated.

13. The utility cart as recited in claim 12 wherein the means for releasing the brakes is hand-actuated.

14. The utility cart as recited in claim 13 wherein two low-rolling resistance wheels with latch-type brakes are positioned substantially below the center of gravity.

15. The utility cart as recited in claim 1 further comprising:
   (a) three or more wheels for movably supporting the cart upon the tarmac, at least two of which are fitted with latch-type brakes which are normally latched; and
   (b) means for unlatching the brakes only when operated.

16. The utility cart as recited in claim 15 wherein the means for releasing the brakes are hand-actuated.

17. The utility cart as recited in claim 16 wherein two low-rolling resistance wheels with latch-type brakes are positioned substantially below the center of gravity.

18. A utility cart which minimizes damage caused by impact with objects comprising:
   (a) a wheeled frame;
   (b) a top structure extending horizontally above the frame, the structure having a periphery which approximates the periphery of the frame; and
   (c) means for normally supporting the top structure above the frame, the supporting means being laterally collapsible for permitting the top structure to be displaced laterally while remaining substantially horizontal so as to minimize energy transfer upon lateral impact with the periphery of the top structure, wherein the supporting means comprises three or more supports, the supports being biased in the upright position so as to support vertical loads, yet under lateral impact will deflect laterally, absorbing the energy of the impact, wherein each support comprises (1) a bottom plate mounted to the frame; (2) a top plate mounted to the top structure and in a first position being normally located vertically above the bottom plate; (3) a tubular member extending between the top and bottom plates and having a bottom end abutting the bottom plate and a top end abutting the top plate, the top and bottom ends of the tubular member cooperating with their respective top and bottom plates such that vertical loads can be transferred from the top to the bottom plates; and (4) tensioning means secured between the top and bottom plates for elastically connecting the top and bottom plates, spaced by the tubular member, so that under vertical loads to the top plate, the tubular member is maintained normally upright, and under lateral loads to the support or top plate, the top plate and top of the tubular member deflect laterally with minimal resistance to the lateral load, wherein the tubular member is a tubular body having a bore and parallel right planar top and bottom ends, wherein the top plate has a planer surface and the bottom plate has a planar surface which is parallel to and faces the top plate's planar surface, and wherein each planar surface of the top and bottom plates have central protuberances which project into the bore of their respective abutting tubular member's top and bottom ends, so that when the top end of the tubular member is deflected laterally, the top end of the tubular member pivots about the protuberance on the top plate and the bottom end of the tubular member pivots about the protuberance on the bottom plate.

19. The utility cart as recited in claim 18 wherein the tensioning means is an elastic member.

20. The utility cart as recited in claim 18 wherein the tensioning means comprises:

(a) an elongated connector having top and bottom ends, the elongated connector being laterally flexible, the top end of which is affixed at the top structure and the bottom end of which extends through the protuberance of the bottom plate; and (b) an elastic compression member located beneath the bottom plate and having top and bottom ends, the top end abutting the bottom plate, the bottom end of the elongated connector being affixed at the bottom end of the elastic compression member so that when the top end of the tubular member is deflected laterally, the bottom end of the tubular member pivots about the protuberance on the bottom plate, pulling the bottom end of the elongated connector and compressing the compression member, thereby creating a tubular member righting-force.

21. The utility cart as recited in claim 20 wherein the elongated connector is a cable.

22. The utility cart as recited in claim 20 wherein the compression member is a coil spring.

23. The utility cart as recited in claim 18 further comprising:

(a) three or more wheels for movably supporting the cart upon the tarmac, at least two of which are fitted with latch-type brakes which are normally latched; and (b) means for unlatching the brakes only when operated.

24. The utility cart as recited in claim 23 wherein the means for releasing the brakes is hand-actuated.

25. The utility cart as recited in claim 18 wherein two low-rolling resistance wheels with latch-type brakes are positioned substantially below a center of gravity of the utility cart.

26. A method for absorbing shock with a utility cart, comprising:

(a) providing a top structure positioned above a frame, the top structure being supported above the frame by one or more support members, each support member being divided into first and second segments that are movably interconnected;

(b) in response to an external force exerted on the utility cart, displacing the top structure laterally relative to the frame by moving the first segment of each support member relative to the second segment, wherein the external force overcomes a resistive force exerted by an elastic member on each first segment to cause the displacement of the top structure;

(c) when the external force is less than the resistive force, returning each of the top structure and the first segments to a respective starting position.

27. The method of claim 26, wherein in the displacing step the longitudinal axes of the first and second segments are transverse to one another and after the returning step the longitudinal axes of the first and second segments are at least substantially collinear with one another.

28. The method of claim 26, wherein in the displacing step a top end of a first segment pivots about a protuberance in a top plate and a bottom end of the first segment pivots about a protuberance in a bottom plate.

29. The method of claim 28, wherein an elastic compression member is located beneath the bottom plate and in the displacing step the compression member is elastically deformed.

30. A utility cart which minimizes damage caused by impact with objects comprising:

(a) a wheeled frame;

(b) a top structure extending horizontally above the frame, the structure having a periphery which approximates the periphery of the frame; and (c) a support member for normally supporting the top structure above the frame, the support member including a base member rigidly connected to the wheeled frame and a tubular member flexibly connected to the top structure and being laterally collapsible for permitting the top structure to be displaced laterally while remaining substantially horizontal, so as to minimize energy transfer upon lateral impact with the periphery of the top structure, wherein in an uncollapsed mode the longitudinal axes of the base member and tubular member are at least substantially parallel and in a collapsed mode the longitudinal axes of the base member and tubular member are transverse to one another.

31. The utility cart as recited in claim 30 further comprising three or more of the supports, the supports being biased in the upright position so as to support vertical loads, yet under lateral impact will deflect laterally, absorbing the energy of the impact.

32. The utility cart as recited in claim 31 wherein the top structure is a load-bearing roof.

33. The utility cart as recited in claim 32 wherein the roof is shaped as an airfoil for interacting with airflow flowing thereover so as to generate downward forces.

34. The utility cart as recited in claim 31 wherein each support comprises:

(a) a bottom plate mounted to the frame;

(b) a top plate mounted to the top structure and in a first position being normally located vertically above the bottom plate;

(c) the tubular member extending between the top and bottom plates and having a bottom end abutting the bottom plate and a top end abutting the top plate, the top and bottom ends of the tubular member cooperating with their respective top and bottom plates such that vertical loads can be transferred from the top to the bottom plates; and (d) tensioning means secured between the top and bottom plates for elastically connecting the top and bottom plates, spaced by the tubular member, so that under vertical loads to the top plate, the tubular member is maintained normally upright, and under lateral loads to the support or top plate, the top plate and top of the tubular member deflect laterally with minimal resistance to the lateral load.

35. The utility cart as recited in claim 34 wherein (a) the tubular member is a tubular body having a bore and parallel right planar top and bottom ends; and (b) the top plate has a planer surface and the bottom plate has a planar surface which is parallel to and faces the top plate's planar surface.

36. The utility cart as recited in claim 35 wherein each planar surface of the top and bottom plates have central protuberances which project into the bore of their respective abutting tubular member's top and bottom ends, so that when the top end of the tubular member is deflected laterally, the top end of the tubular member pivots about the protuberance on the top plate and the bottom end of the tubular member pivots about the protuberance on the bottom plate.

37. The utility cart as recited in claim 36 wherein the tensioning means is an elastic member.

38. The utility cart as recited in claim 37 wherein the tensioning means comprises:

(a) an elongated connector having top and bottom ends, the elongated connector being laterally flexible, the top end of which is affixed at the top structure and the bottom end of which extends through the protuberance of the bottom plate; and (b) an elastic compression member located beneath the bottom plate and having top and bottom ends, the top end abutting the bottom plate, the bottom end of the elongated connector being affixed at the bottom end of the elastic compression member so that when the top end of the tubular member is deflected laterally, the bottom end of the tubular member pivots about the protuberance on the bottom plate, pulling the bottom end of the elongated connector and compressing the compression member, thereby creating a tubular member righting-force.

39. The utility cart as recited in claim 38 wherein the elongated connector is a cable.

40. The utility cart as recited in claim 38 wherein the compression member is a coil spring.

41. The utility cart as recited in claim 30 further comprising:

(a) three or more wheels for movably supporting the cart upon the tarmac, at least two of which are fitted with latch-type brakes which are normally latched; and (b) a control for unlatching the brakes only when operated.

42. The utility cart as recited in claim 41 wherein the control is hand-actuated.

43. The utility cart as recited in claim 42 wherein two low-rolling resistance wheels with latch-type brakes are positioned substantially below the center of gravity.

* * * * *